G. FINNEY.
SAW SET.
APPLICATION FILED AUG. 16, 1916.
1,239,779.
Patented Sept. 11, 1917.
2 SHEETS—SHEET 1.
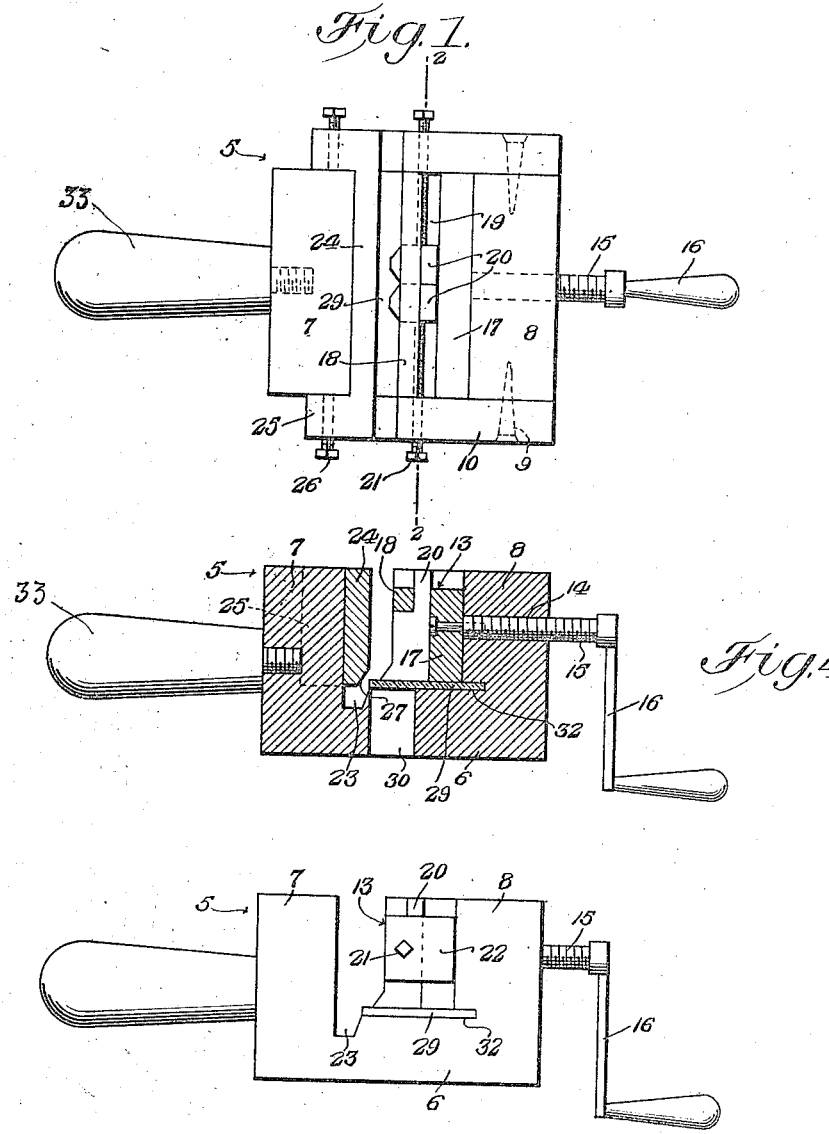
Witnesses
J. H. Crawford
J. A. Murphy
Inventor
George Finney,
By Victor J. Evans
Attorney

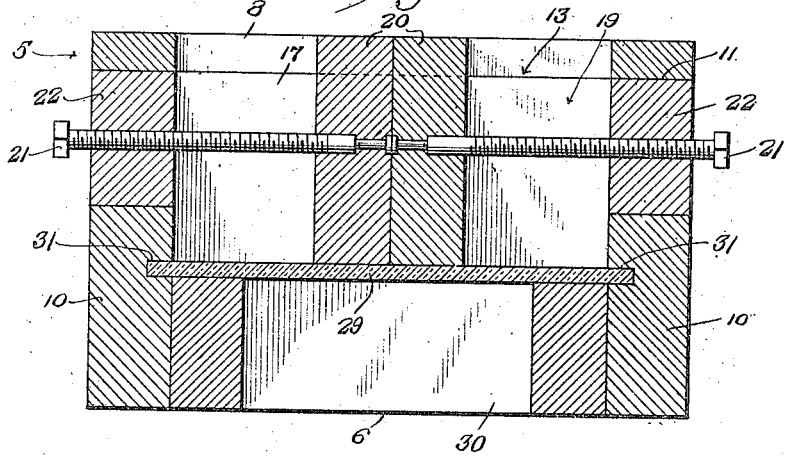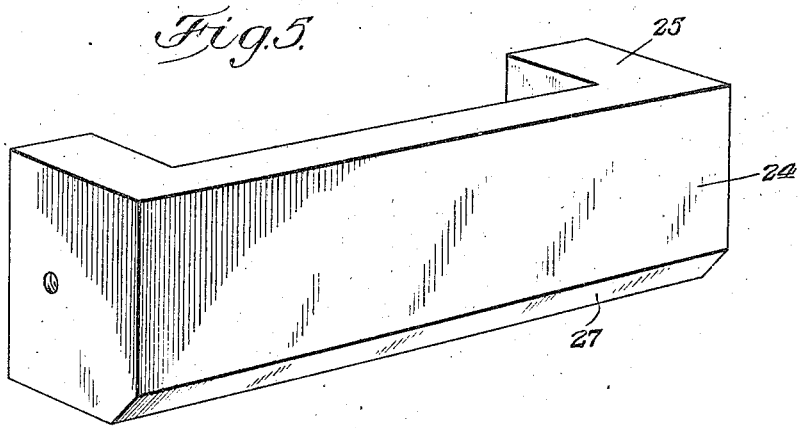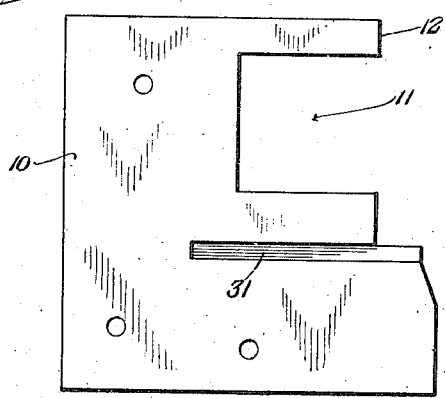

UNITED STATES PATENT OFFICE.

GEORGE FINNEY, OF PLUMMER, IDAHO.

SAW-SET.

1,239,779.

Specification of Letters Patent.

Patented Sept. 11, 1917.

Application filed August 16, 1916. Serial No. 115,255.

*To all whom it may concern:*

Be it known that I, GEORGE FINNEY, a citizen of the United States, residing at Plummer, in the county of Benewah and State of Idaho, have invented new and useful Improvements in Saw-Sets, of which the following is a specification.

The present invention relates to improvements in saw setting apparatus.

The primary object of the invention is the provision of a saw setting apparatus which shall be of a simple, cheap and efficient nature, and wherein the teeth of the saw may be easily and readily set at the desired angle.

I also propose to produce a saw set of this nature of a light but strong construction so that the same may be conveniently carried in the tool box of the operator and further shall include an adjustable gage block mounted on the base for vertical adjustment and in opposition with the said head, thereby enabling the bending of the saw teeth at different angles.

A still further object of the invention is the provision of means supported upon the base which will permit of the operator observing the saw teeth when clamped in the setting apparatus, without the necessity of having to remove the saw therefrom.

A further object of the invention resides in the provision of the setting head with a slot in which are mounted the teeth setting members, and means for holding the setting members in such slot, whereby movement of the same is prevented during the setting action of the saw teeth.

With the above and other objects in view, the invention consists in the novel features, details of construction and combination of parts which will hereinafter be more fully set forth, illustrated in the accompanying drawing and pointed out in the appended claims.

Figure 1 is a top plan view of the saw setting apparatus set up for use;

Fig. 2 is a transverse section taken on line 2—2 of Fig. 1;

Fig. 3 is a side view of the apparatus showing one of the bearing plates and the gage block removed therefrom;

Fig. 4 is a longitudinal sectional view;

Fig. 5 is a perspective view of the gage block; and

Fig. 6 is a side elevation of one of the bearing plates, clearly illustrating the groove formed in the inner face thereof for receiving one edge of the glass.

Referring more particularly to the accompanying drawing, in which like characters of reference refer to corresponding parts in the several views, the saw setting apparatus is denoted generally by the character 5 and comprises a broadened bed plate 6 of substantially rectangular configuration having formed at one end thereof and contiguous therewith a vertical supporting arm 7. The opposite end of the bed plate 6 is formed with a vertically extending bearing lug 8 arranged in spaced parallelism with the supporting arm 7. Detachably connected to the vertical side edges of the bearing lug 8 through the medium of screws or other suitable fasteners 9 is a pair of bearing plates 10 having a U-shaped opening 11 opening out through the front edge 12 of said plates and in which is mounted for longitudinal siding adjustment a setting head 13. The said bearing lug 8 is formed with an axial internally threaded opening 14 in which is threadedly mounted the screw rod 15 having connection at its inner end with the setting head 13. The opposite or outer end of the operating screw is formed with a squared portion on which the operating crank 16 is mounted, thus it will be seen upon operating the crank 16 it will impart movement to the screw 15, which in turn causes the adjustment of the setting head in a direction toward or from the supporting arm 7.

This setting head 13 embodies a broad rear cross plate 17 and a forward narrow cross strip 18, the cross strip 18 being disposed in spaced relation with the cross plate 17 defining between the confronting faces thereof a longitudinal slot 19 in which are adjustably mounted the teeth setting members 20. A pair of set screws 21 are threadedly mounted in the trunnions 22 of the setting head, and have threaded connection at their inner ends with the setting members, for adjustably mounting the setting members in the slot 19 of the setting head and positively holding the same in adjusted position to prevent any accidental movement thereof during the bending or setting operation of the saw teeth. The supporting arm 7 is of substantially L-shaped configuration having its horizontal portion disposed in a plane below the plane of the top surface of the bed plate 6, thus presenting or forming a transverse groove 23, the purpose of which will be fully set forth as the description of the invention is proceeded with.

I employ in connection with a saw setting apparatus of the above stated character, a gage block designated by the character 24 and of substantially U-form. The said gage block when associated with the setting apparatus, is mounted on the supporting arm 7 for vertical adjustments. The gage block when in this position is brought to bear against the inner face of the supporting arm with the legs 25 thereof arranged against the opposite side faces of the supporting member and retained in adjusted position therewith through the medium of thumb screws 26. This gage block 24 is provided along its lower portion with a beveled contact point 27, against which the teeth are bent, for properly gaging the angle of bending the saw teeth. Of course, it will be understood that during the bending or setting of the saw teeth, the saw is inserted between the confronting faces of the setting head and gage and the teeth are brought to bear against the beveled point 28 of the setting members. The bearing plates 8 support the setting head 13 slightly above the top face of the bed plate for the purpose of permitting a transparent plate 29 being inserted on the bed plate 6 directly beneath the setting head and over the sight opening 30, formed transversely in the bed plate adjacent one end thereof. This construction will permit of the operator observing at a glance the bending or setting operation of the saw teeth, without the necessity of removing the saw from the apparatus. The said transparent plate 29 is of a length slightly greater than the transverse extent of the bed plate, defining the transverse ends of the transparent plate within the grooves 31 of the bearing plate, while one longitudinal edge of the transparent plate is slidably mounted in the groove 32 formed in the inner face of the bearing lug. By this arrangement the outermost longitudinal edge of the bearing plate will contact with the facing of the gage block and thereby prevent any accidental movements of the transparent plate when inserted in the apparatus. The character 33 denotes a handle whereby the apparatus may be conveniently transported from place to place as the occasion may so demand.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claims appended thereto.

I claim:

1. A saw setting device comprising a bed plate having an opening, a bearing lug formed at one end of the bed plate, bearing plates secured to the bearing lug, a setting head supported by the bearing plates in spaced relation with the bed plate, and means inserted between the setting head and bed plate and covering the opening of said bed plate for permitting observation of the saw teeth.

2. A saw setting device comprising a bed plate having an opening, a bearing lug formed at one end of the bed plate, bearing plates secured to the bearing lug, a setting head supported by the bearing plates in spaced relation with the bed plate, and a transparent plate inserted between the confronting surfaces of the setting head and bed plate.

3. A saw setting apparatus embodying a bed plate formed at one end with a bearing lug having a groove, bearing plates secured to the opposite sides of the bearing lug and bed plate and having a groove registering with the groove of the bearing lug, a setting head mounted in the bearing plates and in spaced relation with the bed plate, and a transparent member supported in the groove of the bearing lug and the grooves of the bearing plate.

4. A saw setting apparatus embodying a bed plate formed at one end with an L-shaped supporting arm, the horizontal portion of the supporting arm being disposed below the plane of the top surface of the bed plate providing a transverse groove, an adjustable setting head connected with the bed plate, and an adjustable gage block connected to the vertical portion of the supporting arm and having a beveled edge, and means connected with the gage block for permitting the adjustment thereof in a direction toward or away from the said groove to permit of the bending of the saw teeth at different angles.

5. A saw setting apparatus embodying a bed plate, a supporting arm formed at one end thereof, a bearing lug formed at the opposite end of said bed plate and having a threaded opening, bearing plates having U-shaped openings secured to the opposite side faces of the bearing lug and bed plate, a setting head mounted in the U-shaped openings of the bearing plates, an operating screw threadedly mounted in the opening of the bearing lug and connected with the setting head, a crank for operating said screw to cause a longitudinal adjustment of the setting head, a gage block mounted on the supporting arm, and a handle formed on the supporting arm.

6. A saw setting apparatus embodying a bed plate, a setting head adjustably associated with the bed plate, means carried by the setting head for effecting the setting operation of the saw teeth, and means inserted between the setting head and bed plate for permitting observation of the saw teeth during the setting operation thereof.

In testimony whereof I affix my signature.

GEORGE FINNEY.

Copies of this patent may be obtained for five cents each, by addressing the "Commissioner of Patents, Washington, D. C."